(12) United States Patent
Chang

(10) Patent No.: US 8,412,285 B2
(45) Date of Patent: Apr. 2, 2013

(54) SPEAKER MODULE OF PORTABLE TERMINAL AND METHOD OF EXECUTION OF SPEAKERPHONE MODE USING THE SAME

(75) Inventor: Ju-Hee Chang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 12/950,026

(22) Filed: Nov. 19, 2010

(65) Prior Publication Data
US 2011/0124379 A1 May 26, 2011

(30) Foreign Application Priority Data
Nov. 25, 2009 (KR) ........................ 10-2009-0114310

(51) Int. Cl.
*H04M 1/00* (2006.01)
(52) U.S. Cl. ............... 455/569.1; 455/550.1; 455/556.1; 455/570; 381/26; 381/56; 381/58; 381/59
(58) Field of Classification Search ............... 455/550.1, 455/556.1, 569.1, 570; 381/26, 56, 58, 59
See application file for complete search history.

(56) References Cited

U.S. PATENT DOCUMENTS

| 4,604,501 | A * | 8/1986 | Richmond et al. | 379/388.05 |
| 4,715,062 | A * | 12/1987 | Korsky et al. | 379/406.04 |
| 6,321,080 | B1 * | 11/2001 | Diethorn | 455/416 |
| 7,761,106 | B2 * | 7/2010 | Konchitsky | 455/501 |
| 2005/0014535 | A1 * | 1/2005 | Desai et al. | 455/569.1 |
| 2005/0136848 | A1 * | 6/2005 | Murray | 455/79 |
| 2006/0188089 | A1 * | 8/2006 | Diethorn et al. | 379/406.01 |
| 2008/0013749 | A1 * | 1/2008 | Konchitsky | 381/94.7 |

* cited by examiner

*Primary Examiner* — Fayyaz Alam
(74) *Attorney, Agent, or Firm* — Jefferson IP Law, LLP

(57) ABSTRACT

A speaker module of a portable terminal and a method of execution of a speakerphone mode using the same are provided. The speaker module includes a nondirectional microphone, a directional microphone, at least one speaker, and a controller. The nondirectional microphone is applied to one side of the portable terminal. The directional microphone is applied to another side of the portable terminal. The at least one speaker is installed in the same direction near the directional microphone. When the portable terminal is in a speakerphone mode, the controller controls to detect voice signal levels and/or frequency characteristics input to the two microphones, sets a transmission/reception mode of the portable terminal, and mute-processes a corresponding microphone.

13 Claims, 5 Drawing Sheets

SPEAKER MODULE OF PORTABLE TERMINAL AND METHOD OF EXECUTION OF SPEAKERPHONE MODE USING THE SAME

PRIORITY

This application claims the benefit under 35 U.S.C. §119 (a) of a Korean patent application filed in the Korean Intellectual Property Office on Nov. 25, 2009 and assigned Serial No. 10-2009-0114310, the entire disclosure of which is hereby incorporated by reference.

BACKGROUND OF THE INVENTION

1. Field of the Invention

The present invention relates to a microphone and speaker integrated speaker module. More particularly, the present invention relates to a speaker module of a portable terminal and a method of execution of a speakerphone mode in the portable terminal to prevent an echo phenomenon between a speaker and a microphone in the speakerphone mode.

2. Description of the Related Art

Due to recent developments in the mobile communication industry, portable terminals have progressed rapidly. Because conventional portable terminals were simply used for wireless communication between two users located at a long distance, the portable terminals supported only a receiver having close contact with a user's ear generated a relative low sound pressure. The conventional portable terminals were not in need of a speaker (e.g., a loud speaker) generating a high sound pressure to enable a user to listen to a called party's voice even at a long distance.

Recent portable terminals have been developed with several functions. As an internal/external flash memory capacity of the portable terminals increase, the portable terminals have the ability to support a function of reproduction of music and video, for example, reproduction of MPEG Audio Layer-3 (MP3), an Audio Video Interleave (AVI) file and the like, watching TeleVision (TV), and the like. The portable terminals have now become portable multimedia devices beyond a function of simple voice communication.

On the other hand, when a user makes a voice call, it is inconvenient to use the receiver. As a result, portable terminal manufacturers have developed speaker modules having various forms and functions that coincide with the portable terminals form and function. The portable terminal manufacturers have provided efforts to design slim portable terminals to meet consumers' desire while applying the speaker module to the portable terminals.

With the efforts provided by the portable terminal manufacturers, the size of the portable terminals have been reduced by integrating and installing an internal antenna radiator, a speaker, a microphone, and a vibrator on one housing or carrier, and mounting a unified housing having the integrated devices installed on a main board of the portable terminal.

On the other hand, in order to prevent an echo phenomenon in a speakerphone mode between the speaker and the microphone, which is installed adjacent to the speaker, another microphone is installed for speakerphone use in a position spaced a preset distance apart from the speaker. Although a stereo speaker is used in the multimedia function operation, only one speaker installed in the position spaced apart from the microphone for speakerphone use is used in the speakerphone mode in order to solve the echo problem.

However, the above described construction of the portable terminal does not provide a slimness design and design applicability because the installation of two microphones in the portable terminal impose limitations on positioning, and using only one speaker can inconvenience a user due to low sound volume during a phone call.

SUMMARY OF THE INVENTION

An aspect of the present invention is to address at least the above problems and/or disadvantages and to provide at least the advantages described below. Accordingly, an aspect of the present invention is to provide a speaker module of a portable terminal and a method of execution of a speakerphone mode in the portable terminal using a speaker adjacent to a microphone in the speakerphone mode.

Another aspect of the present invention is to provide a speaker module of a portable terminal and a method of execution of a speakerphone mode in the portable terminal using a stereo speaker all the time by increasing applicability of two microphones.

A further aspect of the present invention is to provide a speaker module of a portable terminal and a method of execution of a speakerphone mode in the portable terminal to avoid noise or an echo phenomenon in a speakerphone mode when a speaker is arranged near two microphones, and to prevent space or design limitations caused by a microphone installation position.

The above aspects are provided by a speaker module of a portable terminal and a method of execution of a speakerphone mode using the same.

According to an aspect of the present invention, a speaker module of a portable terminal is provided. The speaker module includes a nondirectional microphone, a directional microphone, at least one speaker, and a controller. The nondirectional microphone is applied to one side of the portable terminal. The directional microphone is applied to another side of the portable terminal. The at least one speaker is installed in the same direction near the directional microphone. When the portable terminal is in a speakerphone mode, the controller controls to detect voice signal levels and/or frequency characteristics input to the two microphones, sets a transmission/reception mode of the portable terminal, and mute-processes the corresponding microphone.

According to another aspect of the present invention, a method of execution of a speakerphone mode using a speaker module of a portable terminal having a nondirectional microphone applied in front of the portable terminal, a directional microphone applied in rear of the portable terminal, at least one speaker, and a controller for controlling the two microphones based on a transmission/reception state when the portable terminal is in a speakerphone mode is provided. The method includes determining if the portable terminal is in the speakerphone mode, when the portable terminal is in the speakerphone mode, determining if the nondirectional microphone and the directional microphone simultaneously recognize a receiving voice signal level, and when two microphones simultaneously recognize the receiving voice signal level, mute-processing the two microphones and enabling only the speaker.

The method may further include determining if only the nondirectional microphone recognizes a transmitting voice signal level, and enabling the nondirectional microphone and mute-processing the directional microphone, if only the nondirectional microphone recognizes the transmitting voice signal level.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
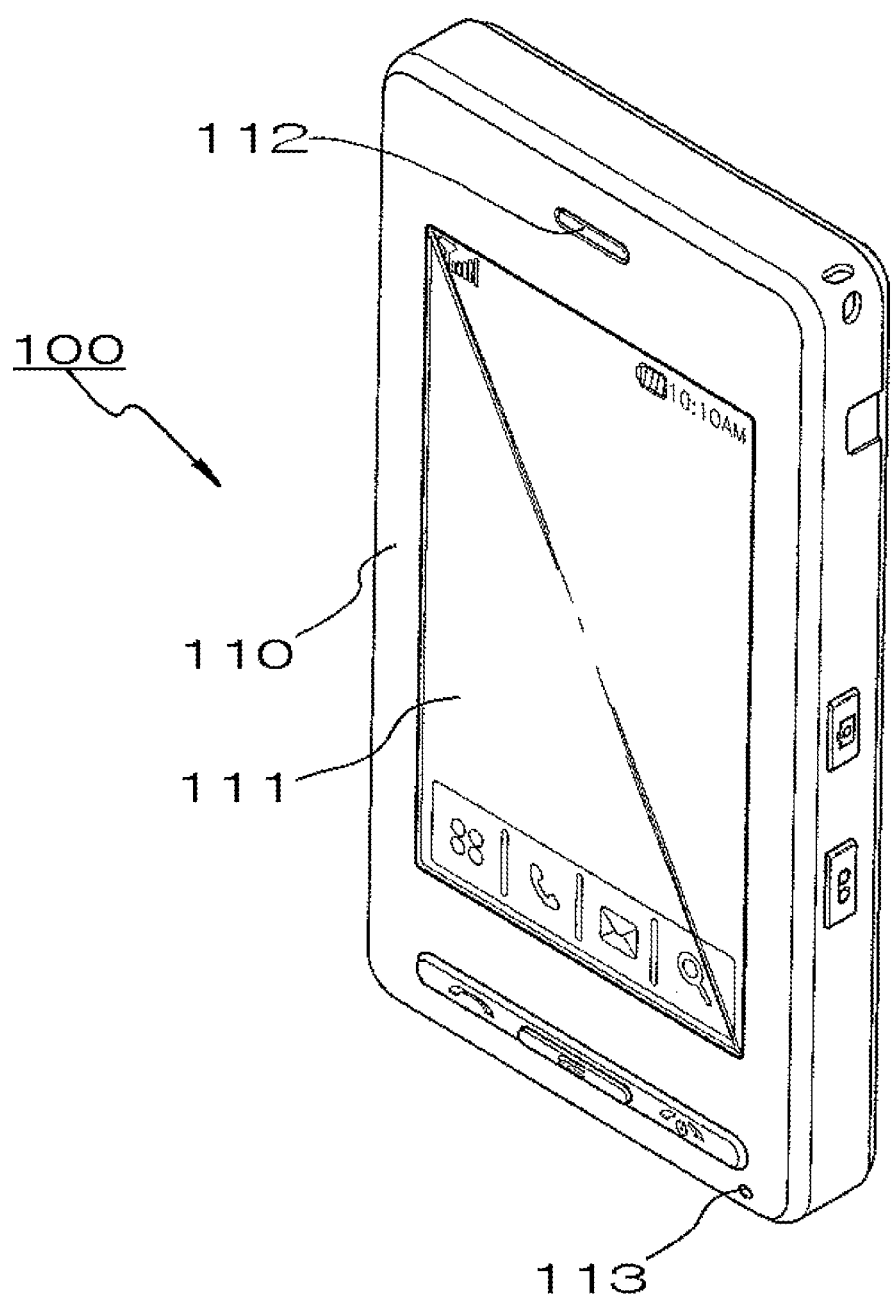
FIG. 1 is a perspective diagram illustrating a portable terminal with two microphones according to an exemplary embodiment of the present invention.

FIG. 1 is a perspective diagram illustrating a portable terminal with two microphones according to an exemplary embodiment of the present invention.

A bar type portable terminal is illustrated in FIG. 1. However, the present invention is applicable to a variety of portable terminals capable of applying a speaker module and performing a speakerphone function. The portable terminals, for example, perform various opening/closing operations such as a folder type portable terminal, a slide type portable terminal and the like.

Referring to FIG. 1, the portable terminal 100 includes a display unit 111 installed in front of a body 110, a receiver 112 installed at the top of the display unit 111, and one microphone (MIC) 113 installed at the bottom of the display unit 111. The MIC 113 is a first MIC 113 installed in the portable terminal 100 and is a nondirectional MIC. The display unit 111 may be a touch screen.

The portable terminal 100 includes a speaker module installed at the bottom of the portable terminal. The speaker module is constructed on a carrier mounting an antenna radiator that is installed at the bottom of a main board. The speaker module includes the first MIC 113 installed in front, and a second MIC 13 (illustrated in FIG. 3) and a speaker 12 (illustrated in FIG. 3) installed in the rear. The speaker 12 may be a mono speaker or a stereo speaker.

In an exemplary embodiment of the present invention, in a case where the portable terminal 100 is in a speakerphone mode, the two MICs 113 and 13 are selectively controlled for operation or non-operation. Although the speaker 12 is installed together with the second MIC 13 and operates all the time, an obstacle phenomenon such as echo and the like does not take place. A detailed construction of the speaker 12 installed together with the second MIC 13 is described below.

Figure 2:
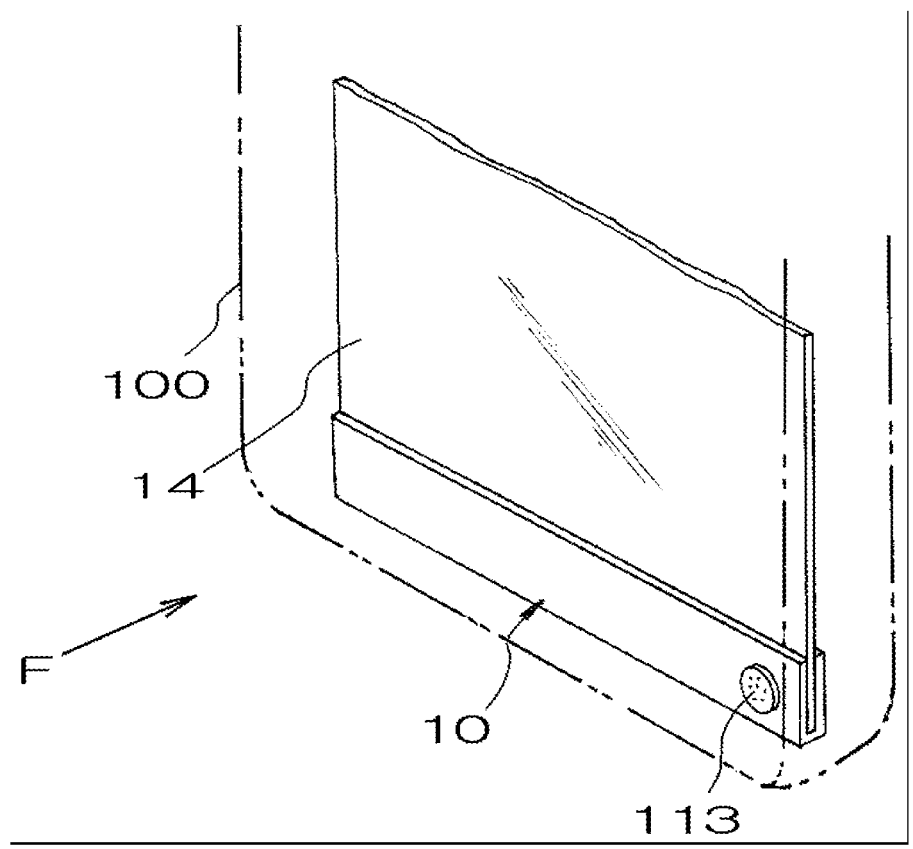
FIG. 2 is a perspective diagram illustrating a nondirectional antenna in a front part of a portable terminal according to an exemplary embodiment of the present invention.
Figure 3:
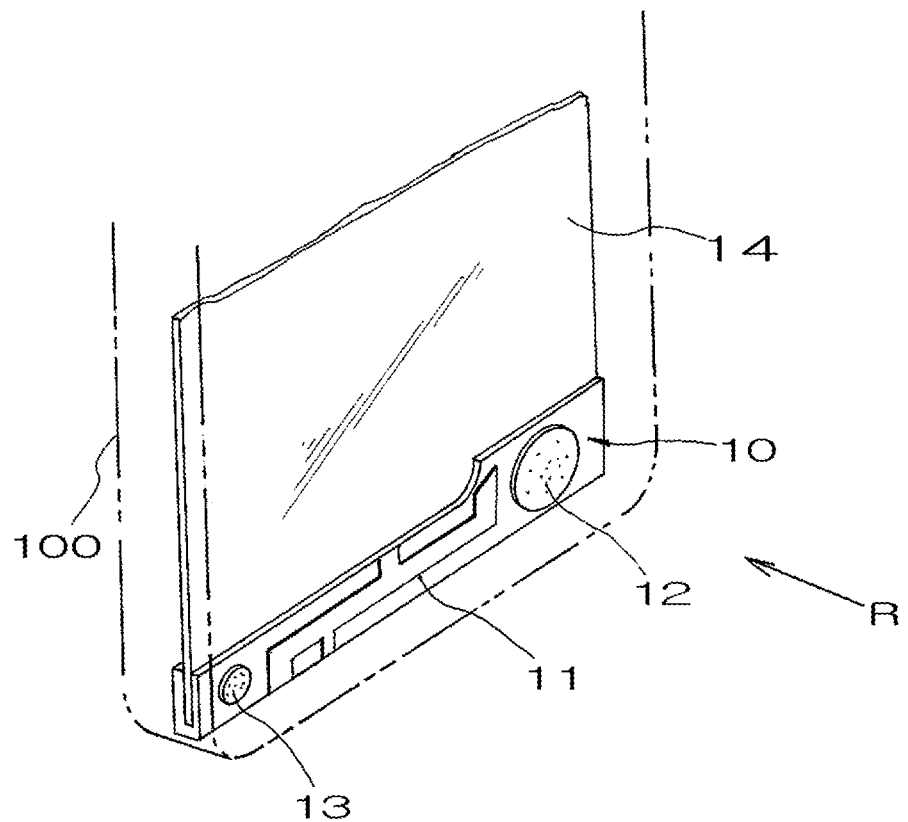
FIG. 3 is a perspective diagram illustrating a directional antenna in a rear part of a portable terminal according to an exemplary embodiment of the present invention.

FIG. 2 is a perspective diagram illustrating a nondirectional antenna in a front part of a portable terminal a according to an exemplary embodiment of the present invention. FIG. 3 is a perspective diagram illustrating a directional antenna in a rear part of a portable terminal according to an exemplary embodiment of the present invention.

Referring to FIGS. 2 and 3, the speaker module according to an exemplary embodiment of the present invention may include two MICs 113 and 13, a speaker 12, and an antenna radiator 11 together on one carrier 10. The carrier 10 is installed at the bottom of the main board 14. The two MICs 113 and 12, the speaker 12 and the antenna radiator 11 are mounted on the carrier 10. When the carrier 10 is installed in the main board 14 of the portable terminal, the antenna radiator 11, the two MICs 113 and 13, and the speaker 12 may simultaneously electrically connect with each other. However, the antenna radiator 11, the two MICs 113 and 13, and the speaker 12 may be constructed to electrically connect to a suitable place of the main board 14 by a separate flexible printed circuit.

Referring to FIG. 2, the first MIC 113 is installed in front of the carrier 10 (i.e., in a front direction (F) of the portable terminal). The first MIC 113 is a nondirectional MIC.

Also, the second MIC 13 is installed in the rear of the carrier 10 (i.e., in a rear direction (R) of the portable terminal). The second MIC 13 is a directional MIC. The speaker 12 is installed at one side of the second MIC 13. In an exemplary embodiment of the present invention, FIG. 2 illustrates the speaker module with one speaker 12. However, the present invention is not limited thereto. For example, two stereo speakers may be installed in the speaker module for an effective multimedia function of the portable terminal. However, the second MIC 13 may be installed in the same direction as a radiation direction of the speaker 12, and the second MIC 13 may be installed in a position capable of, in a speakerphone mode operation, receiving and detecting a voice signal from the speaker 12 based on an operation angle range of the second MIC 13.

Also, the speaker module unifies and installs the two MICs 113 and 13 and the speaker 12 on one carrier 10. However, it is not required that the antenna radiator 11 and a vibrator (not illustrated) be additionally installed if there is available space on the carrier 10.

Figure 4:
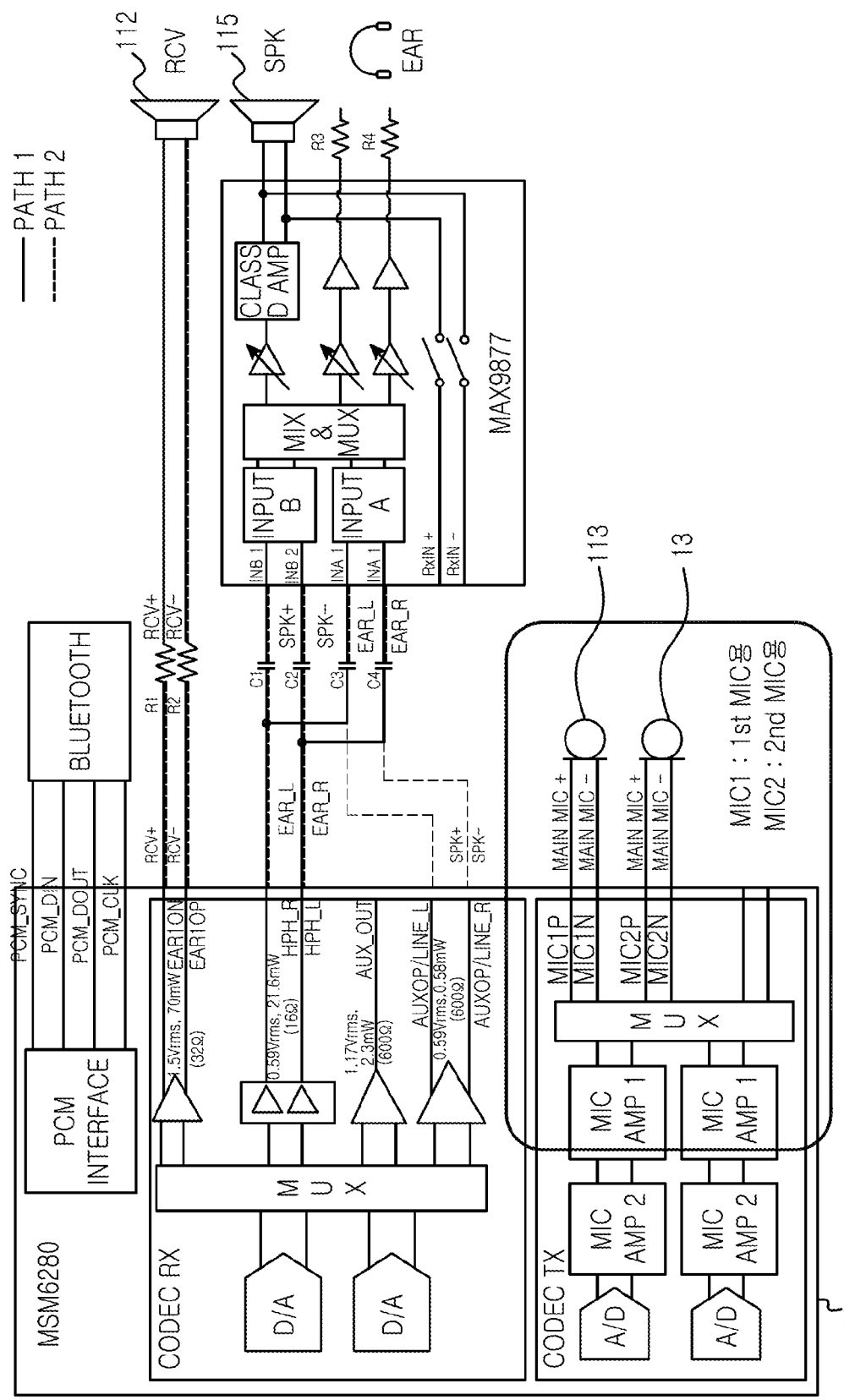
FIG. 4 is a circuit diagram illustrating a construction of a portable terminal with two microphones according to an exemplary embodiment of the present invention.

FIG. 4 is a circuit diagram illustrating a construction of a portable terminal with two MICs according to an exemplary embodiment of the present invention.

Referring to FIG. 4, two MICs 113 and 13, a receiver 112, and a speaker 115 each connect to a transmit/receive end of a controller 101 including a codec. The two MICs 113 and 13 may use different basebands designed by two Analog to Digital Converters (ADCs), respectively. The two MICs 113 and 13 may have a similar structure that is well known in the art.

Figure 5:
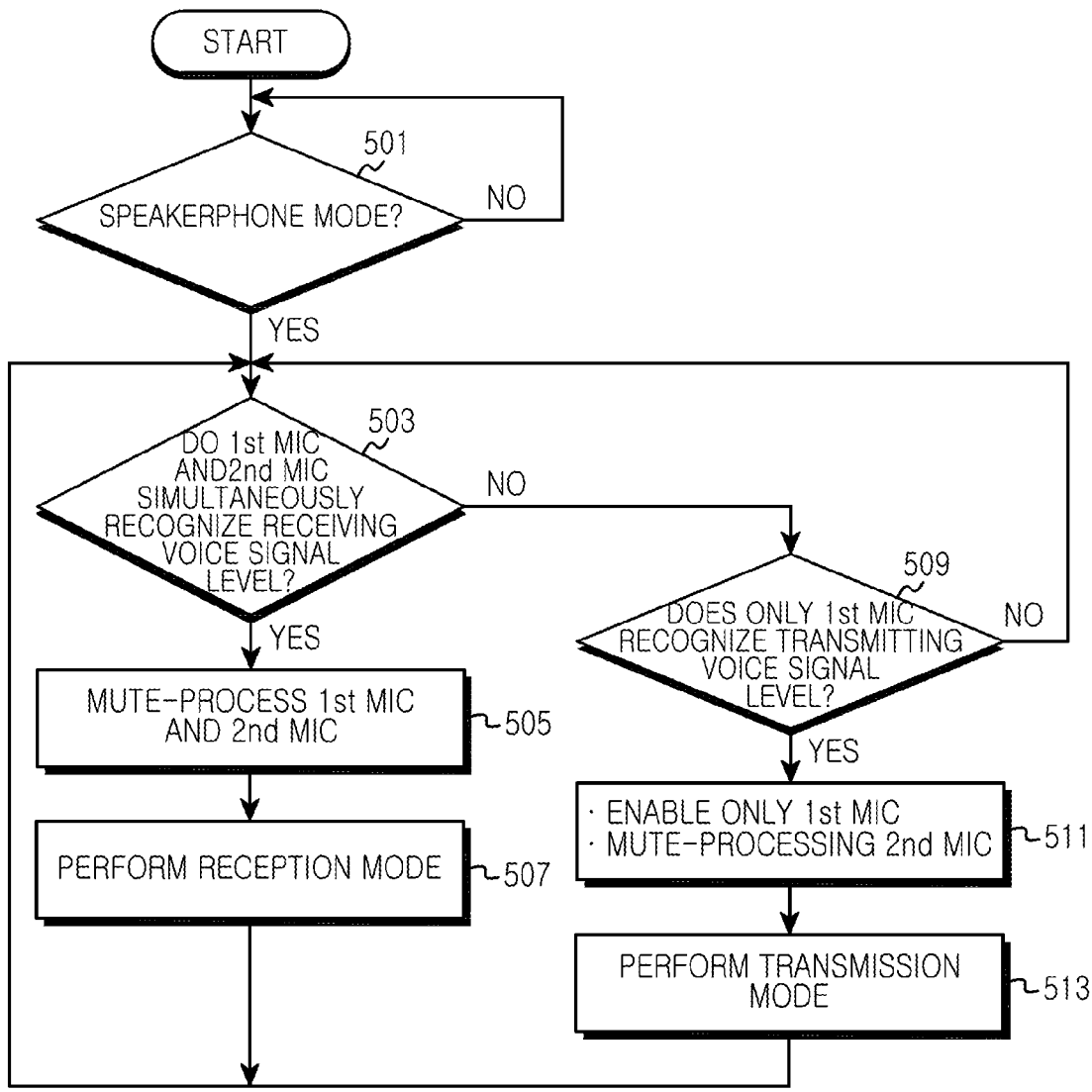
FIG. 5 is a flow diagram illustrating a procedure for executing a speakerphone mode of a portable terminal with two microphones according to an exemplary embodiment of the present invention.

FIG. 5 is a flow diagram illustrating a procedure for executing a speakerphone mode of a portable terminal with two MICs according to an exemplary embodiment of the present invention.

Referring to FIG. 5, in step 501, a controller detects a user's key input and determines if a speakerphone mode is entered. If it is determined that the speakerphone mode is entered, the controller proceeds to step 503 and determines if a first (1st) MIC and a second (2nd) MIC simultaneously recognize a receiving voice signal level. Here, the receiving voice signal level represents a called party's voice signal level transmitted through a speaker. The controller determines if a current receiving voice signal level is equal to or greater than a preset receiving voice signal level. If the two MICs both receive the preset receiving voice signal level or a receiving voice signal level greater than the preset receiving voice signal level, the controller proceeds to step 505 and determines that the key input is a speakerphone mode and mute-processes the two MICs. Then, the controller proceeds to step 507 and performs a speakerphone reception mode. Accordingly, a speaker echo phenomenon caused by the MIC may be prevented. For example, the speaker echo phenomenon may be prevented because the 1st MIC, a nondirectional MIC, may detect a preset voice signal level, and the 2nd MIC, a directional MIC, may detect a voice signal level received from the speaker installed in the same direction as the 2nd MIC, if the portable terminal is in a state in which a called party's voice is transmitted from the speaker. The current receiving voice signal level is compared with the preset receiving voice signal level and the controller determines whether to mute the two MICs. The controller may consider not only the voice signal level but also a frequency characteristic.

On the other hand, if it is determined in step 503 that the 1st MIC and the 2nd MIC do not detect the receiving voice signal level, the controller proceeds to step 509 and determine if only the 1st MIC recognizes a transmitting voice signal level. Also, the determination may be performed by a comparison with a preset voice signal level. In this case, the 2nd MIC, the directional MIC, may receive a relatively weak voice signal level because a sender's voice is input weakly. Accordingly, the controller proceeds to step 511 and enables only the 1st MIC and mute-processes the 2nd MIC that is no longer needed. The controller then proceeds to step 513 and performs a speakerphone transmission mode.

Although not illustrated, in a case where a user and a called party simultaneously talk to each other, the controller may detect preset subdivided voice signal levels, determine a difference between the voice signal levels detected in the 1st MIC and the 2nd MIC, and determine the speakerphone transmission/reception mode. That is since recent portable terminals provide transmission/reception mode conversion of 20 ms possible, exemplary embodiments of the present invention also provide transmission/reception mode conversion possible in a Double Talk (DT) mode.

A speaker module according to the exemplary embodiments of the present invention can perform a speakerphone function with a microphone installed near a speaker, without noise or an echo phenomenon caused by the microphone. Also, by installing the speaker and at least two microphones as one module, a portable terminal have a slim design.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A speaker module of a portable terminal, the speaker module comprising:
a nondirectional microphone applied to one side of the portable terminal;
a directional microphone applied to a side opposite to the one side of the portable terminal to which the nondirectional microphone is applied;
at least one speaker installed adjacent to the directional microphone on the same side to which the directional microphone is applied; and
a controller for, when the portable terminal is in a speakerphone mode, controlling to detect at least one of voice signal levels and frequency characteristics input to the two microphones, to set a transmission or reception mode of the portable terminal, and to mute-process the corresponding microphone.

2. The speaker module of claim 1, further comprising:
a main board of the portable terminal; and
a carrier installed at the bottom of the main board and for housing the two microphones and the at least one speaker together.

3. The speaker module of claim 2, wherein the speaker comprises at least two stereo speakers.

4. The speaker module of claim 2, wherein the carrier further installs an antenna radiator electrically connecting to the main board.

5. The speaker module of claim 1, wherein, when the controller is in a speakerphone reception mode, the controller mute-processes the two microphones.

6. The speaker module of claim 1, wherein, when the controller is in a speakerphone transmission mode, the controller enables the nondirectional microphone and mute-processes the directional microphone.

7. The speaker module of claim 1, wherein the nondirectional microphone is installed in front of the portable terminal and the directional microphone is installed in rear of the portable terminal.

8. A method of execution of a speakerphone mode of a portable terminal comprising a nondirectional microphone applied to one side of the portable terminal, a directional microphone applied to a side opposite to the one side of the portable terminal to which the nondirectional microphone is applied, at least one speaker installed adjacent to the directional microphone on the same side to which the directional microphone is applied, and a controller for controlling the two microphones based on a transmission or reception state when the portable terminal is in a speakerphone mode, the method comprising:

when the portable terminal is in the speakerphone mode, determining if the nondirectional microphone and the directional microphone simultaneously recognize a receiving voice signal level; and when the two microphones simultaneously recognize the receiving voice signal level, mute-processing the two microphones and enabling only the speaker.

9. The method of claim 8, wherein, when the two microphones are mute-processed and only the speaker is enabled, the controller is in a speakerphone reception mode.

10. The method of claim 8, further comprising:

when the portable terminal is in the speakerphone mode, determining if only the nondirectional microphone recognizes a transmitting voice signal level; and when the nondirectional microphone recognizes the transmitting voice signal level, enabling the nondirectional microphone and mute-processing the directional microphone.

11. The method of claim 10, wherein, when the nondirectional microphone is enabled and the directional microphone is mute-processed, the speakerphone is in a speakerphone transmission mode.

12. The method of claim 10, wherein the speaker comprises at least two stereo speakers.

13. A portable terminal, comprising:

a nondirectional microphone applied to one side of the portable terminal;

a directional microphone applied to a side opposite to the one side of the portable terminal to which the nondirectional microphone is applied;

at least one speaker installed adjacent to the directional microphone on the same side to which the directional microphone is applied; and a controller for, when the portable terminal is in a speakerphone mode, controlling to detect at least one of voice signal levels and frequency characteristics input to the two microphones, to set a transmission or reception mode of the portable terminal, and to mute-process the corresponding microphone.

* * * * *